United States Patent [19]

Fish, Jr. et al.

[11] Patent Number: 5,082,610

[45] Date of Patent: * Jan. 21, 1992

[54] PROCESS FOR SURFACE TREATING THERMOPLASTIC MONOFILAMENTS

[75] Inventors: Robert B. Fish, Jr.; Robert L. Rackley, both of Parkersburg, W. Va.; Robert K. Anderson, Signal Mountain; Michael H. Mainz, Chattanooga, both of Tenn.

[73] Assignee: E. I. Du Pont de Nemours and Company, Wilmington, Del.

[ * ] Notice: The portion of the term of this patent subsequent to May 1, 2007 has been disclaimed.

[21] Appl. No.: 425,403

[22] Filed: Oct. 23, 1989

Related U.S. Application Data

[63] Continuation-in-part of Ser. No. 106,653, Oct. 13, 1987, Pat. No. 4,921,668.

[51] Int. Cl.$^5$ .......................... D01F 6/60; D01D 5/12; D01D 10/02
[52] U.S. Cl. .................................. 264/80; 264/178 F; 264/210.2; 264/210.5; 264/210.7; 264/210.8; 264/211.15; 264/211.17
[58] Field of Search ............... 264/80, 178 F, 205, 264/210.2, 210.5, 210.7, 210.8, 211.15, 211.17, 234, 235, 345, 346

[56] References Cited

U.S. PATENT DOCUMENTS

| | | | |
|---|---|---|---|
| 3,153,106 | 10/1964 | Schlick | 264/78 |
| 3,539,668 | 11/1970 | Hayman | 264/80 |
| 3,662,055 | 5/1972 | Bates | 264/167 |
| 4,009,511 | 3/1977 | Gauntt | 264/210 F |
| 4,056,652 | 11/1977 | Gauntt | 428/400 |
| 4,338,277 | 7/1982 | Saito et al. | 264/235.6 |
| 4,568,632 | 2/1986 | Blum et al. | 427/54.1 |
| 4,822,451 | 4/1989 | Ouderkirk et al. | 156/272.2 |

FOREIGN PATENT DOCUMENTS

45-7689 3/1971 Japan .

Primary Examiner—Hubert C. Lorin

[57] ABSTRACT

An improved process comprising treating monofilaments with high temperatures to deorient the surface. A preferred product is a heavy denier transparent polyamide monofilament, especially suitable as fishing line.

15 Claims, 2 Drawing Sheets

PROCESS FOR SURFACE TREATING THERMOPLASTIC MONOFILAMENTS

CROSS-REFERENCE TO RELATED APPLICATION

This is a Continuation-in-Part of copending application Ser. No. 07/106,653, filed Oct. 13, 1987, now U.S. Pat. No. 4,921,668.

BACKGROUND OF THE INVENTION

Oriented thermoplastic monofilaments have long been used in a variety of applications, including, for example, tire cord and fishline. Typically, the monofilament is extruded, quenched, and oriented by drawing in one or more stages to improve its tensile properties.

Other techniques have been previously developed to further improve the performance characteristics of oriented thermoplastic monofilaments. High knot strength polyamide monofilaments can be prepared using high pressure steam, as disclosed in Boyer, et al., U.S. Pat. No. 3,063,189. Gauntt, in U.S. Pat. Nos. 4,056,652 and 4,009,511 discloses treatment with high pressure steam in the first drawing stage of monofilament production, and Saito, et.al., in U.S. Pat. No. 4,338,227, discloses treatment with high pressure steam in the second drawing stage. These patents generally teach that treatment of the filament surface with high pressure steam can increase the knot strength by deorienting the surface of the filament.

A major disadvantage of these techniques is that they require a high pressure steam enclosure to operate. The high pressure steam enclosures are costly to construct and operate. Also, when filament breaks occur, restringing is time-consuming and therefore costly because the steam pressure must be relieved and the high pressure enclosure opened. In addition, for a fishline, the highest possible transparency is desireable.

Despite the known drawbacks of steam treatment, its use has continued for the processing of thermoplastic monofilament, since the steam treatment accomplished the desired property improvement without seriously depreciating the other desireable performance characteristics.

SUMMARY OF THE INVENTION

The present invention is based on the discovery that heat from sources other than high pressure steam can be effectively used to deorient the surface of a monofilament, and improve the knot strength, and, at the same time, produce a treated filament which has superior appearance and performance characteristics.

Specifically, the present invention provides, in the process for production of thermoplastic monofilaments by extruding a monofilament through a die, quenching and orienting the monofilament by stretching in at least two draw stages to a total draw ratio of at least about 4.5 times its original length, the improvement comprising drying the monofilament surface after quenching and passing the monofilament in a substantially moisture-free condition through a heating zone having a temperature at least about 800 Centigrade degrees above the melting point of the polymer from which the monofilament is made, for a time sufficient to deorient the surface of the monofilament, but not sufficient to melt the interior of the monofilament.

DETAILED DESCRIPTION OF THE INVENTION

The monofilaments prepared according to the present invention can be made from a wide variety of drawable fiber-forming thermoplastic polymers and, in particular, polyamides, polyesters, and polyolefins. Of these, polyamides and polyesters are preferred, and polyamides have been found to be particularly satisfactory. Blends of two or more polyamides or two or more polyesters have also been found to provide desireable balances of properties.

Polyamides which can be used include those which have a relative viscosity (ratio of solution and solvent viscosities in a capillary viscometer at 25° C. using an 8.4% by weight solution of polymer dissolved in formic acid containing 10% by weight of water) of about 50 or more and preferably at least about 70. Such polyamides include the polymers of diamines and dicarboxylic acids or the functional equivalents of dicarboxylic acids such as dicarboxylic acid chlorides or diamides, or of amino acids or lactams, and copolymers thereof. Representative polyamides which can be used include polyhexamethylene adipamide (6,6 nylon), polytetramethylene adipamide (4,6 nylon) and poly-e-caproamide (6 nylon) and copolymers thereof.

Representative polyesters which can be used include polyethylene terephthalate and polybutylene terephthalate.

Representative polyolefins which can be used in the present invention include those prepared from olefins of from one to four carbon atoms, of which polypropylene is preferred.

A preferred product of this invention is a polyamide monofilament. For use as tire cord, polyhexamethyalene adipamide has been found to be particularly satisfactory, especially that having a denier greater than 100, preferably 1000–6000, and characterized by a transparent appearance as indicated by a Transmitted Light Value of at least 67%, a straight tenacity of greater than 7 gpd, preferably greater than 8 gpd, knot tenacity >4 gpd, and a polymer surface layer less than about 40 microns thick. The surface layer has a parallel refractive index less than that of the core. The monofilament cross-section can be of any shape, but substantially flat ribbon-shaped cross section is preferred for selected applications where increased flexibility is desired.

To achieve the high levels of clarity and transmittance characteristic of the monofilaments resulting from the surface treatment process of this invention, such monofilaments should be substantially free of delusterants, pigments, dyes or other additives which reduce transmittance, such as titanium dioxide. Typical levels of polymerization catalysts (such as phosphorus compounds) or stabilizer materials (such as phenolic derivatives or copper salts) in the polymer do not appear to reduce monofilament transmittance significantly. It is important to exercise control of temperature, tension and smoothness of roll and guide surfaces in order to minimize surface damage and to obtain smooth, clear filaments.

Monofilaments resulting from the present invention which exhibit particularly outstanding performance as fishing line comprise nylon 6,6 polymer or copolymer and have a non-round filament cross-section and a modification ratio of at least about 2.0. The modification ratio is defined as the ratio of the diameter of the major axis of the monofilament cross-section divided by diameter of the minor axis. A ribbon-like cross-section is preferred. Strength, durability, knottability and sensitivity of the nylon 66 line with a ribbon-like cross-section were all rated excellent in fishing trials opposite commercial round nylon 6 line. Castability was particularly outstanding in that the high-test 6,6 nylon line (40 lbs.) had the casting properties of a relatively light-test nylon 6 line (14 lbs.). It is believed that the non-round, flat, ribbon-like cross-section increases the flexibility and thereby improves the castability. For satisfactory flexibility and castability, the modification ratio of nylon 66 monofilament fishing line should be at least about 2.0, and a modification ratio of at least about 2.5 is preferred.

The processing conditions used for the extrusion and orientation of the monofilament are substantially the same as normally used in the art for the particular polymer from which the monofilament is prepared. For example, for 6,6 nylon, melt processing temperatures of about from 270° to 300° C. can be used. The polyamide filament is melt spun through either a round, obround or rectangular (rounded corners), or other such relatively large spinneret orifice, subjected to attenuation in an air gap below the spinneret and quenched in a liquid, preferably water, bath at a temperature less than about 50° C. (for 6,6 nylon). The air gap is generally about from 10 to 40 inches (25–100 cm) in length and the distance traveled in the water bath is greater than about 80 inches (200 cm). The optimum air gap and distance traveled in the water will vary with the polymer used as well as the processing conditions such as process speeds and melt temperatures. The tension in the air gap and water bath is minimized in order to also minimize development of molecular orientation in the filament surface which would inhibit subsequent orientation stretching and development of strength in the filament.

The specific orientation conditions will, of course, vary with the particular polymer used and the tensile properties desired. However, for 6,6 nylon, in the two-stage drawing process, the amount of draw in the first stage should be in the range of 3.5 to 4.2X for 6,6 nylon, preferably about 3.8X for optimum tensile properties. Optionally, the first stage draw rolls are heated in order to preheat the filament prior to entering the radiant heater in the second stage. This serves primarily to lessen the load on the radiant heater but is not required for optimum product or process performance. It is important to bring the core temperature of the filament to a certain level during second stage drawing to allow sufficient drawing for optimum straight tensiles while bringing the surface to a high enough temperature to deorient the surface for optimum knot tensiles.

The heating in the second stage stretching involves the use of a radiant heater at a temperature of 600°–1300° C., with an exposure time such that the filament surface temperature remains about 5°–50° C. below the melting point of the polymer. One such heater which can be used has resistance coils enclosed in and anchored with respect to an interiorly insulated, cylindrical casing which radiates heat onto the filament. The actual construction, length, number of passes etc. through the heater can be varied as desired as long as the filament surface temperature reaches 200°–255° C. (for 6,6 nylon), preferably 230°–255° C. Temperatures for other polymers would have to be adjusted based on their melting points. The molecular deorientation of the surface resulting from the combination of surface treatment according to the present invention and radiant heating allows the filament to be drawn at least 1.3X in the second stage without increasing break levels. This results in a further increase in overall molecular orientation and straight tenacity while maintaining, or even increasing knot tenacity.

After quenching and prior to treatment of the filament according to the present invention, substantially all liquid must be removed from the filament surface or subsequent high temperature treatment will be ineffective. Liquid can be removed, for example, by air jets and/or felt wipers dried by vacuum. Dryness can be determined by touching the filament with a medium shade cotton cloth for several seconds. Any substantial amount of liquid will make a dark spot on the cloth.

In accordance with the present invention, after the monofilament surface quenched and dried, it is passed, in a substantially moisture-free condition, through a heating zone having a temperature at least about 800 Centigrade degrees above the melting point of the polymer from which the monofilament is made, for a time sufficient to deorient the surface of the monofilament, but not sufficient to melt the interior of the monofilament.

The heat source used to provide the elevated temperature of the present invention is not critical, and can include, for example, flame treating and high temperature electrical resistance furnaces. Still other heat sources which can be used include the heat from a gas fired indirect heater, electrical induction heaters, or reflected light or heat from lasers.

The location of the high temperature treatment in the monofilament production process is not important to obtain the desired result, so long as the treatment is sufficiently long to provide the required deorientation of the monofilament surface. It has been found particularly convenient to apply the intense heat treatment in the first draw stage. However, the treatment in subsequent draw stages or in the relaxation stage or in combinations can also be used, and would not depart from the spirit from this invention.

If flame treatment is used as the high temperature source which substantially eliminates surface orientation, it has been found that pairs of flames directed at the top and bottom of the filament simultaneously are particularly satisfactory, and are accordingly preferred. Although it is possible to use any of the large range of fuels for the flame, pairs of oxyacetylene flames have been found to be particularly useful. In a preferred mode of the present invention, the flame orifice pairs are approximately one inch apart, aimed counter to the filament motion, with an included angle of 45–90 degrees. The filament is aligned to pass between the tips on the bisector of the included angle. If the filament has a non-round cross-section, the wider surfaces should preferably face the flames.

The exact shape of the flames and distance of the flame from the filament surface is empirically established to yield maximum straight and knot tensiles. It is believed that the optimum conditions result in a filament surface temperature from very near the melting point (within 20° C.) of the filament to as high as 40° C.

above the melting point. The high temperature attained by the surface, as well as the core, assists orientation-stretching through subsequent stages of draw. In a preferred embodiment, the flames are used in the first stage of draw. At this point, the speed of the monofilaments is slowest and it is easier to effect the heating. When so used, the actual draw point is after the flame treatment, generally within 6 inches of the point at which the flame impinges on the filament surface. This distance will, however, vary depending on the filament temperature going into the flame as determined by the air and water quench conditions, by denier, by processing speed, and by the extent of draw (i.e. draw tension) in the first stage.

Other fuels can also be used for the flame, depending on the temperature desired, polymer used, process speed, etc. An enclosure around the flame or flames is not required, but may be useful to provide safer operation and to remove combustion gases.

Among the key advantages of the flame over other techniques used previously are the environmentally clean nature of the flame and the compactness and simplicity of the process. Further, the compactness of the flame unit allows more production units to be built in the same amount of space, providing increased efficiency and lower costs, as well as allowing some existing spinning units to be retrofitted to produce monofilaments. The flame unit will also generally be easier to use on a continuing basis because of the simple mechanics involved versus a steam unit, the latter requiring opening and sealing of the pressure chamber each time a position is strung up. Thus, added advantages include improved efficiency and yields, and lower manufacturing costs.

The surface deorientation can also be effected according to the present invention using a high temperature furnace for the monofilament treatment. The high temperature furnace is often preferred over flame treatment processes, since the furnace permits excellent controllability and obviates the use of flammable gasses. Moreover, high temperature furnaces can provide more uniform treatment, since the temperature is more easily adjusted, and will not vary with gas pressures as in flame treatment.

A variety of construction materials and designs can be used for such a furnace, as will be evident to those skilled in the art. The important features of such a furnace are that it provide a heating zone of a temperature at least about 800 Centigrade degrees higher than the melting point of the polymer from which the monofilament is made, for a time sufficient to deorient the surface of the monofilament, but not sufficient to melt the interior of the monofilament.

The high temperature draw furnace used in the invention can be constructed of heating elements of molybdenum disilicide (available as Kanthal Super 33 heating elements from Kanthal Corporation, Bethel, Connecticut) which provide the heater temperatures required for nylon above 1400 degrees Celsius. A furnace enclosure capable of withstanding these temperatures while not contributing excessive heat transmission to the incoming or outgoing filaments is also needed. One such enclosing material found to be particularly satisfactory is a ceramic foam insulation commercially available as Cera-Foam from Rex-Roto Corporation, Fowlerville, Michigan. A furnace of these components was used in the Examples of the present invention in which the surface treatment for the monofilament was not provided by a flame.

The furnace should be designed to prevent excessive penetration of the heat into the monofilament. The optimum temperature profile would be a step change from ambient temperature to the high intensity zone and back to ambient temperatures, since that limits penetration of the heat beyond the surface of the monofilament. However, in actual operating conditions, since insulation must be applied to the furnace and since the insulation has a finite heat capacity, a temperature profile is created between the ambient and furnace temperatures. The path length of this gradient is preferably minimized by cutting out a wedge shaped section of the furnace insulation along the monofilament entrance and exit paths.

Figure 5:
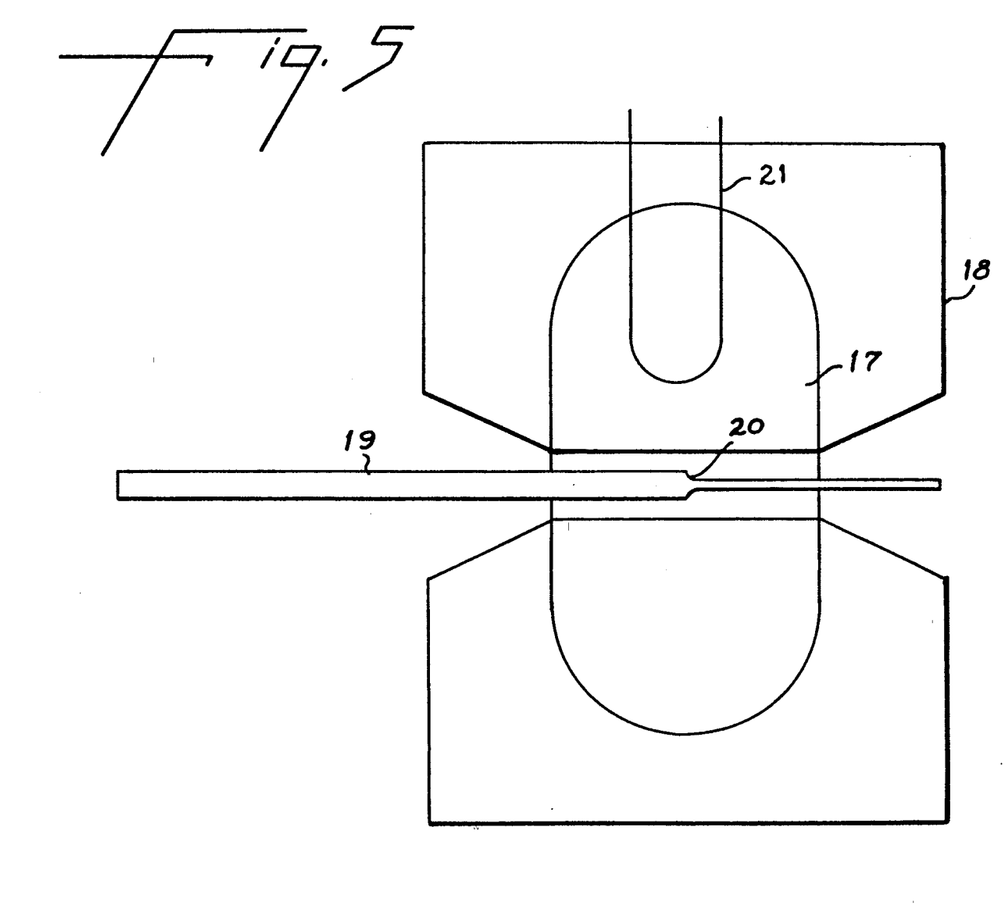
FIG. 5 is a schematic cross-sectional view of a furnace which can be used in the present invention.

A schematic view of such an arrangement in a furnace is shown in FIG. 5. There, heating chamber 17 is surrounded by insulation 18. Filament 19 is drawn through the furnace, and accordingly decreases in diameter as it passes through the furnace at draw point 20. The furnace is heated by element 21, connected to a power source, not shown.

Since the filament is being drawn in the furnace, its speed changes its speed inside the furnace. Therefore, changes in the location of the draw point will change the exposure time of the filament in the furnace.

The specific temperature range used will vary with the polymers being treated as well as the colorant levels within a polymer.

In the operating Examples using a high temperature furnace, median, maximum and minimum residence times are shown for each example. The exposure times were calculated by dividing the length of the furnace by the filament speed. The minimum was calculated, using the filament speed at the first draw roll, the maximum was calculated using the filament speed at the feed roll, and the median speed was calculated using the average of those two speeds.

The products resulting from the present invention are clear and transparent. They exhibit an optically visible surface layer having a thickness of less than about 40 microns, and preferably 3-40 microns, which has reduced orientation relative to the filament core. The surface having the reduced orientation is also less porous than that produced by steam treatment.

The orientation of the surface layer described herein is less than that of the core as measured by the parallel component of the refractive index. The surface is also distinctly different from that of a steam treated product in terms of surface porosity. This can be demonstrated by comparing adhesion of samples in rubber, adhesion being a sensitive measure of the structural characteristics of a surface. Using a standard 2-ply adhesion test, the flame treated samples will have a hot 2-ply strip adhesion of less than 44 lbs. (2 N). Generally the flame treated samples are 20-80% lower in adhesion than steam treated samples described by Gauntt. Better adhesion of steam treated samples is believed due to the diffusion of water into the surface of steam treated samples which creates "holes" between fiber material, this effect being further enhanced by evaporation of water during subsequent high temperature steps in the process.

The high strength monofilaments of the present invention have a denier greater than about 100, preferably 500 to 6000 for most common end-uses, but can be as high as 15,000. These products are particularly useful for fishing lines wherein the combination of high strength (straight tensile and knot), transparency and lower index of refraction of the surface versus core are unique. This product will also be useful in other uses requiring an easily workable strength member or reinforcing material. Other potential end uses include ropes, cables, bristles, tire cords and fishing nets.

The products, through the high temperature treatment, exhibit low orientation on the surface. In addition, through the substantial absence of moisture during this treatment, the filaments exhibit excellent surface uniformity. In addition to providing good optical characteristics, this surface uniformity reduces breaks during the drawing operation, thus improving process continuity. Moreover, when the products resulting from the instant invention are used as fishline, the surface uniformity provides lower drag characteristics in the water.

The present invention is further illustrated by the following specific Examples and Control Examples, in which the following test methods are used.

Optical Clarity (% Transmitted Light)

Relative differences in fiber clarity were determined by measuring the amount of 1 transmitted through the fiber using an optical microscope (Leitz "Dialux" or equivalent) fitted with a photometer (Leitz MPV compact, or equivalent). A special feature of this photometer system allows the observation of the adjustable, illuminated four-leaf rectangular diaphragm together with the image of the fiber surface. For this work, photometric measurements were made with a x6.3 objective and x10 eyepieces with the diaphragm dimensions corresponding to 0.085 mm×0.78 mm as measured with a Bausch & Lomb calibration slide.

The fiber was mounted on a standard microscope slide without cover-slip or immersion oil. With the microscope focused on the upper surface of the fiber, the substage condenser is set for Koehler illumination with the top condenser element swung out of the optic train. Photometric measurements should be made with the substage condenser iris diaphragm in its fully open position.

The photometer was calibrated by positioning the slide to an empty field of view and regulating the gain until the digital display (in volts) indicates 100. After blocking the photometer, the dark current is then set to 0. The measurements were obtained by positioning the fiber so that the illuminated rectangular slit was superimposed on the central region of the fiber and its long axis was parallel to the fiber axis. An attempt was made to exclude from measurement portions of fiber containing obvious mechanical defects such as might arise from contact with guides, pins and the like whose effect would be to reduce the amount of light transmitted. Three measurements of transmittance were obtained along a 1" length of five different portions of fiber sampled along the threadline approximately 5 meters in total length.

Hot, 2-Ply Strip Adhesion Test

The test utilized was the same as ASTM Test D-4393-85; Strap Peel Adhesion of Reinforcing Cords or Fabrics to Rubber Compounds (pages 1133-1142; 1985 Annual Book of ASTM Standards, Section 7, Volume 7.01) with a few modifications. The particular variation used was to test individual monofilament tire cords that had been RFL dipped singly. The rubber stock employed was a combination of natural rubber (80 parts by weight), styrene-butadiene rubber (20 parts), N351 Black (35 parts), plus minor amounts of other conventional ingredients. The dipped tire cords were wrapped so that adjacent cords directly abutted each other. For example, 2,000 denier dipped cord required about 26 ends per inch. After embedment of the cords in the rubber stock, the sample was cured at 160° C.±2° C. for 20 minutes at 1340 kPa pressure. Since hot adhesion was desired, the samples were heated in the Instron oven at 120° C.±2° C. for 25±5 minutes prior to testing. The separation force was based on Option 1 (the mid-line between the high and low peaks of separation force). Eight samples per warp were tested and the results were reported as average force in pounds per inch.

Parallel Refractive Index and Surface Thickness

Where reported herein, the refractive index for light polarized parallel to the filament axis, n $\parallel$ a measure of orientation within the monofilament. A Leitz double beam interference microscope was used to determine whether the refractive index, n $\parallel$, near the fiber surface is above or below a reference immersion medium. In addition interference fringe displacements were used to interpolate between immersion media or extrapolate a small amount beyond one immersion medium. Immersion liquids used were the Cargille (Cedar Grove, N.J.) Series A liquids. Illumination used was the 0.546 micron wavelength from a high pressure mercury lamp. The immersion liquid refractive indices were assumed to be the value provided by Cargille, i.e. they were not corrected for the wavelength difference between 0.589 microns, where they were calibrated, and the 0.546 micron wavelength illumination used or for the difference between calibration temperature and their temperature during the measurements. Consequently all refractive index values quoted herein, while sufficiently accurate for the purpose, are approximately 0.0047 lower than the absolute refractive indices of the fibers at a wavelength of 0.546 microns. The tests were all run at 23.9±0.5° C.

Figure 1:
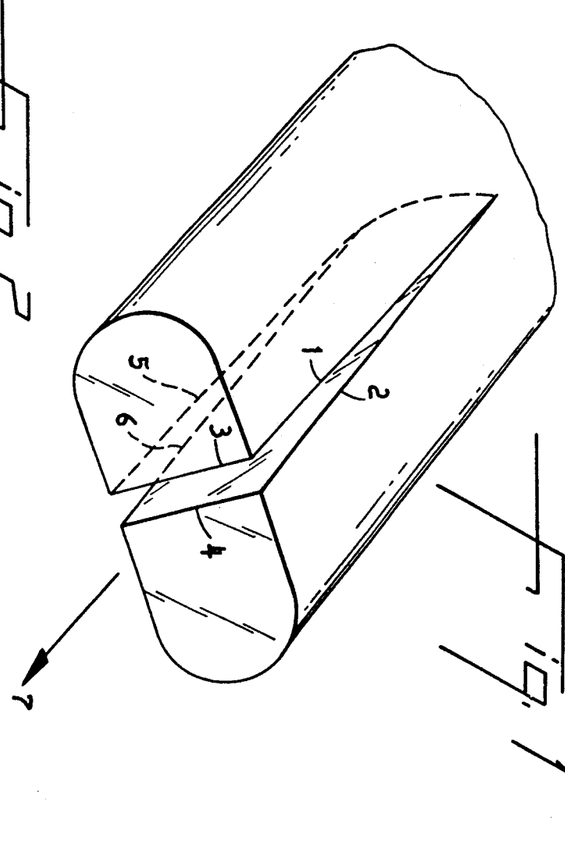
FIGS. 1-4 are perspective and cross-sectional illustrations of a monofilament resulting from the present invention and testing apparatus used for its evaluation.
Figures 2, 3:
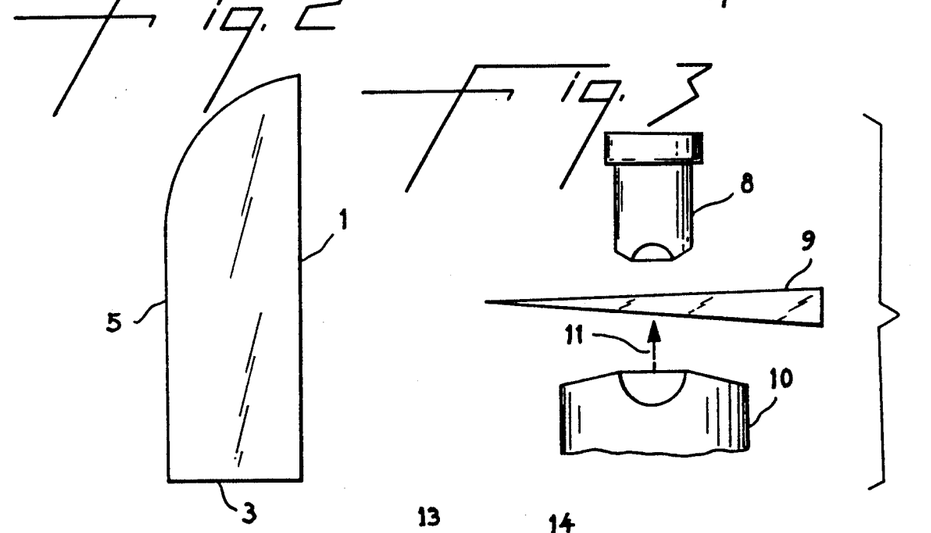
Figure 4:
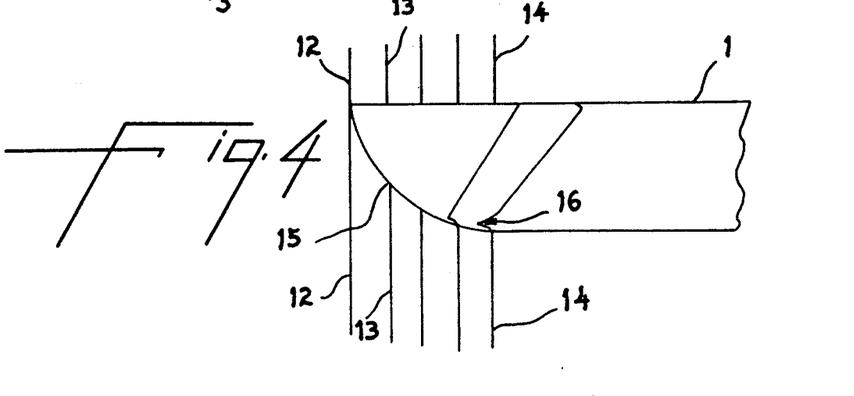

Measurements were made on wedge-shaped longitudinal sections cut with a razor blade at the minor diameter of the obround or ribbon-like cross-section monofilaments. FIG. 1 shows the location, orientation and shape of a section as it would be made in the case of an obround monofilament. In FIG. 1, arrow 7 represents the monofilament axis. The obround cross-section shown is perpendicular to this axis. Lines 1, 2, 3, 4, 5 and 6 represent the intersections of the cut planes with the surface of the monofilament. Lines 3 and 4 are not exactly parallel to each other. The angles between the two cuts are such that the thickness of the section will gradually taper from 100 micrometers to zero over a distance along the fiber axis of 3-4 mm. FIG. 2 is a plan view of a section cut according to FIG. 1. FIG. 3 shows the arrangement of a wedge-shaped section in the interference microscope. In FIG. 3, represents the objective lens, 9 represents the section, 10 represents the condensor lens and arrow 11 represents the light path in the microscope. Arrow 11 in FIG. 3 is perpendicular to the plane of FIG. 2. FIG. 4 shows the key points of the interference microscope image. In FIG. 4, vertical lines 12, 13 and 14 represent interference fringes. Fringe 12 passes outside of the section, and is straight. Fringe 13, moving from the bottom to the top of the figure, intersects the section at position 15, where the section tapers to zero thickness. This arrangement makes it possible to be certain that a fringe inside of the section is connected with the same fringe outside of the section. Fringe 14 intersects the section at position 16, a place convenient for making measurements on edge 5. Edge 1 is not useful.

When a section made as described above is used, the surface parallel index determined is that on the long side of the obround fiber. The same technique is also applicable to round monofils and to monofils of other shapes. For any of these shapes, the sections should be cut so that optical measurements would be made with the microscope axis parallel to the most important fiber bending axis, e.g. parallel to the bending axis in the knot test.

Two immersion liquids were used, having refractive indices of 1.570 and 1.560. One other liquid with refractive index of 1.548 was used to confirm observations, but was not used in actual calculations. Other liquids might be useful, as the immersion refractive index should be kept within 0.1 of the specimen, particularly in regions like the near surface zone where refractive index can change rapidly with position. To provide a method for extrapolation and interpolation of refractive indices which differ from these liquids, the two liquid method of eliminating geometrical path difference was applied, being careful to keep the measured interference fringes running as nearly as possible over the same region of the section. To apply this method with sufficient accuracy, it is necessary that specimens be prepared carefully. Analysis was done on micrographs at a final magnification of 325–340X. For the values cited in this application, the parallel refractive index of the surface was measured within 5 microns of the fiber surface, while the parallel refractive index of the core was measured within 10% of the distance from the center to the fiber surface on either side of the center of the fiber.

The thickness of the deoriented near-surface layer discussed in this application is the normal distance from the surface to the position where the refractive index changes rapidly to its relatively constant value in the monofilament core and is determined from measurements of the width of the V-shaped fringe, represented as 16 in FIG. 4, on interference micrographs at a magnification of 340X.

Straight and Knot Tensiles

Before tensile testing, the monofilament, while in package form, is conditioned until the yarn reaches equilibrium moisture content in the test atmosphere (usually 5–7 days). The atmosphere is maintained at a temperature of 75±2° F. and a relative humidity of 55±2%. A recording stress/strain device is used wherein a straight 10 inch long section of monofilament is elongated at a rate of 10 or 20 in./min. until it breaks. During stress/strain testing, the monofilament sample is gripped in air activated Type 4C Instron clamps maintained at least 60 psi pressure. Tenacity is computed by dividing the breaking load in grams by the denier of the sample before testing.

The knot tensiles are measured in the same manner as straight tensiles except that a simple knot is tied in the monofilament at about the midpoint of the sample to be tested. The simple knot is made by crossing a length of monofilament on itself at about the midpoint of its length and pulling one end through the loop so formed. Since the monofilament tends to assume some of the curvature of the windup package, the knot is tied with and against this curvature on separate samples as a sensitive measure of uniformity of treatment. If the different modes of tieing the knot yield knot tensile values beyond the normal variability, experimental conditions are adjusted to provide more uniform treatment of the monofilament and more uniform knot tensiles. For example, the flames may have to be adjusted to treat both sides of the monofilament more uniformly.

Relative Viscosity

Relative viscosity, (RV), as used herein, is the ratio of solution and solvent viscosities measured in a capillary viscometer at 25° C. The solvent is formic acid containing 10% by weight of water. The solution is 8.4% by weight polyamide dissolved in the solvent.

EXAMPLES

Example 1

This Example describes the preparation of 6,6-nylon monofilament with a denier of about 2,000 by the process of this invention. Polyhexamethylene adipamide polymer having a relative viscosity of 70 was extruded at a temperature of 290° C. and a rate of 21.5 lbs./hour (9.8 kg/hr) through a rectangular spinneret orifice having rounded corners (0.088×0.310 inches or 2.2×7.9 mm). The filament so formed was passed vertically downward through an air gap for 26 inches (0.66 m), quenched in a water bath at 32° C. for a distance of 12 feet (3.66 m) and passed to a feed roll having a surface speed of 141 ypm (129 meters/min). The filament was then passed through two oxyacetylene flames, supplied by a mixture of oxygen (at 10.7 psig or 74 KPa) and acetylene (at 4.3 psig or 30 KPa) fed through a common line to two nozzles of 0.028 inch (0.71 mm) diameter, in order to deorient the surface of the filament. The flames were directed countercurrent to the movement of the filament, at an angle of about 30° to the direction of the filament, and were adjusted so that they uniformly impinged the filament to insure even heating. The flame tips were positioned 3/16–¼ inch (4.8–6.4 mm) above and below the filament. The temperature of the filament surface was calculated to be 280°–300° C. at the hottest part of the flame treatment. The temperature calculation was based on actual temperature measurements, using a Barnes infrared measuring device, between 5 inches and 20 inches from the filament surface and extrapolating a plot of temperature versus distance. After the flame treatment, the filament was passed to first stage draw rolls heated to 145° C.

Between the feed roll and first stage draw rolls, the filament was stretched 3.85 x. from the first stage rolls the filament was passed 5 times through a 30 inch (0.76 m) radiant heater at 875°–911° C. and then to second stage draw rolls running at a speed of 800 ypm (732 mpm) which stretched the flame treated and drawn filament an additional 1.48X for a total draw ratio of 5.7X. The filament was then wound onto a package. The filament formed was clear and transparent, had a denier of 2052 and a substantially flat, ribbon-shaped cross-section with a width of 0.274 mm and a thickness of 0.0790 mm. It had excellent tensile properties, and its surface was less oriented than its core as shown by parallel refractive index. Its surface was decidedly less permeable than a similar denier monofilament made by a steaming process (see Control) as shown by the two fold differences in hot, two-ply strip adhesion. Filament properties are given in Table I.

The unique combination of properties of this Example, high transparency, low permeability, lower surface versus core orientation, outstanding straight and knot tensile properties, make it an excellent monofilament product and an ideal candidate for in-water applications such as fishing lines, ropes and cables.

Control Example A

This Example describes the preparation of 6,6 nylon monofilament by a process which was similar to Example 1, with the principle difference being the substitution of a steaming unit in place of the flame unit between the feed and first-stage draw rolls.

A polyhexamethylene adipamide filament of 70 relative viscosity and ribbon-like cross-section was spun, quenched and passed to a feed roll exactly as in Example 1, except that the water bath was 36° C. (versus 32° C.). From the feed roll, the filament was passed through a steam chamber 28 inches (0.71 m) in length containing wet steam at 140 psig (965 kPa) and 179° C. (saturation temperature). After the steam treatment, the filament was passed to first stage draw rolls at ambient temperatures. Between the feed roll and first stage draw rolls, the filament was stretched 3.84X. From the first stage rolls the filament was passed 3X through a 48-inch (1.22 m) radiant heater heated to 947° C. near the entrance and 969° C. at the exit, and then to second stage draw rolls at 800 ypm (732 mpm) which stretched the steam-treated and drawn filament an additional 1.48X for a total draw ratio of 5.68X. The substantially flat, ribbon-like cross-section filament (0.274 mm×0.079 mm) was wound onto a package. Filament properties are given in Table I.

The Control filament had excellent tensile properties. However, the filament was not clear and transparent as Example 1 but milky and translucent. In addition, the surface was more open and permeable, as indicated by the adhesion results. While the Control is an excellent monofilament for certain applications, such as tire cord, it is less than ideal for in-water applications, such as fishing lines, etc.

EXAMPLES 2-6

These Examples describe the preparation of a series of 6,6 nylon monofilaments with deniers from about 500 to about 4,000.

Polyhexamethylene adipamide of 70 relative viscosity was spun, quenched and drawn to a series of monofilaments under conditions that were the same as those of Example 1, except for the following. The polymer spinning throughputs and temperatures, water-bath quench temperatures and second-stage radiant heater temperatures were adjusted to accommodate each of the different deniers of Examples 2-6 as shown in Table II. The other differences of Examples 2-6 as a group opposite Example 1 were: (1) the length of the quench air gap was 24"; (2) the pressure of oxygen was 7 psig and of acetylene was 5 psig leading to the flame; (3) first-stage draw roll temperature was 147° C.; and (4) the number of passes and length of each pass through the radiant heater were 3 and 50", respectively. Other key processing parameters such as draw ratio split, total draw ratio, feed roll and windup roll speeds and spinneret cross-section were the same as in Example 1. The temperatures of the filaments were not measured or calculated. However, immediately after passing through the flame, the monofilaments had a glossy or "wet" appearance indicating that the temperature of the filament surface was at about or higher than the melting point (255°-263° C.).

The product properties of Examples 2-6 are listed in Table I. The monofilaments of Examples 2-5 exemplify a unique combination of properties, including a very high level of clarity, superior tensiles and a filament surface parallel refractive index which is less than that of the core. Example 6, while acceptable in most respects, does not exemplify the high level of clarity, expressed in terms of % Transmitted Light, of Examples 1-5. Microscopic examination of the fiber of Example 6 indicates surface damage and the need to further optimize process conditions, particularly radiant heater temperature. With optimization of these conditions, clarity is expected to improve to well above 70.

EXAMPLE 7

Nylon 66 monofilaments prepared by both the process described in Example 1 and by the process described in U.S. Pat. No. 4,009,511 were evaluated by four expert fishermen. The monofilaments were about 2000 denier with a flat, ribbon-like cross-section of 3.0 modification ratio. The 40 lb. experimental lines were evaluated with regard to a number of parameters. The evaluations of the expert fishermen with regard to monofilaments prepared by both processes were as follows:

No problems in filling the reel;
Castability was excellent and the distance was greater than other conventional fishing lines;
Toughness was excellent and low abrasion and wear;
Breaking strength was excellent and higher than conventional fishing lines;
Stretch/Sensitivity was good;
Knot strength was excellent. Knot was made with a Palomar knot.

TABLE 1

| | Control | Example 1 | Example 2 | Example 3 | Example 4 | Example 5 | Example 6 |
|---|---|---|---|---|---|---|---|
| RV | 70 | 70 | 70 | 70 | 70 | 70 | 70 |
| ok | | | | | | | |
| Denier (Drawn) | 2070 | 2052 | 540 | 1080 | 1602 | 3150 | 4140 |
| Fiber Shape | Ribbon-Like | Ribbon-Like | Ribbon-Like | Ribbon-Like | Ribbon-Like | Ribbon-Like | Ribbon-Like |
| Tensiles: | | | | | | | |
| Straight Tenacity (gpd) | 8.4 | 8.4 | 8.9 | 8.2 | 8.4 | 8.7 | 8.8 |
| Straight Elongation (%) | 20 | 13 | 17 | 18 | 17 | 17 | 18 |
| Knot Tenacity (gpd) | 5.6 | 6.2 | 7.2 | 5.7 | 5.5 | 5.6 | 5.4 |
| Knot Elongation (%) | 13 | 11 | 11 | 11 | 11 | 13 | 14 |
| Parallel | | | | | | | |
| Refractive Index Surface - Long Side | 1.549 | 1.570 | 1.556/1.564 | 1.563/1.568 | 1.570 | 1.566/1.570 | 1.562 |
| Core | >1.57 | 1.577/1.581 | 1.577/1.586 | 1.578/1.580 | 1.576/1.579 | 1.576/1.579 | 1.572 |
| Thickness of | 4-6 | 9 | 20-30 | 30 | 15 | 12 | 12 |

TABLE 1-continued

|  | Control | Example 1 | 2 | 3 | 4 | 5 | 6 |
|---|---|---|---|---|---|---|---|
| Surface Layer (Microns) |  |  |  |  |  |  |  |
| Hot, 2-Ply Strip Adhesion (lbs) | 51 | 27 | 9 | 27 | 32 | 41 | 38 |
| Transmitted Light (%) | 57 | 82 | 68 | 78 | 74 | 72 | 62 |

TABLE 2

|  | Example 2 | 3 | 4 | 5 | 6 |
|---|---|---|---|---|---|
| Polymer Throughput (lbs./hr.) | 5.4 | 10.8 | 16.1 | 32.3 | 43.0 |
| Polymer Spinning Temp.(°C.) | 292 | 292 | 292 | 292 | 291 |
| Water-Bath Quench Temp.(°C.) | 36 | 38 | 38 | 30 | 24 |
| Second-Stage Radiant Heater (°C.) | 724–728 | 712–718 | 717 | 796 | 868–947 |

TABLE III

|  | Ex. 8 | Ex. 9 | Control Ex. B | Control Ex. C |
|---|---|---|---|---|
| OPERATING DATA |  |  |  |  |
| Melt temperature (deg C.) | 222 | 222 | 222 | 222 |
| Orifice Size (mils) | 123 | obround | obround | obround |
| Air gap (in) | 7 | 7 | 7 | 7 |
| Feed Roll speed (fpm) | 125 | 100 | 99 | 130 |
| Furnace length (in) | 4 | 4 | 4 | 4 |
| Furnace temp (deg C.) | 1500 | 1235 | 1216 | 1539 |
| 1st draw roll speed (fpm) | 438 | 350 | 350 | 455 |
| 1st draw ratio | 3.50 | 3.50 | 3.54 | 3.50 |
| Maximum exposure time (sec) | 0.046 | 0.057 | 0.057 | 0.044 |
| 2nd heater temp (deg C.) | 450 | 450 | 450 | 450 |
| 2nd draw roll speed (fpm) | 688 | 550 | 550 | 715 |
| 2nd draw ratio | 1.57 | 1.57 | 1.57 | 1.57 |
| 3rd heater temp (deg C.) | 670 | 650 | 650 | 648 |
| 3rd draw roll speed (fpm) | 775 | 620 | 620 | 806 |
| 3rd draw ratio | 1.13 | 1.13 | 1.13 | 1.13 |
| Overall draw ratio | 6.20 | 6.20 | 6.26 | 6.20 |
| Relaxation temp (deg C.) | 350 | 350 | 350 | 350 |
| Relaxation roll speed (fpm) | 736 | 589 | 589 | 766 |
| Relaxation ratio | 0.95 | 0.95 | 0.95 | 0.95 |
| PHYSICAL CHARACTERIZATION |  |  |  |  |
| Conditions | WET | WET | WET | WET |
| Denier | 1737 | 1226 | 1218 | 1208 |
| Caliper, major, mils | 18.0 |  |  |  |
| Caliper, minor, mils | 17.8 |  |  |  |
| Breakload, lbs | 28.8 | 22.7 | 22.7 | 17.9 |
| Breakload, kg | 13.08 | 10.31 | 10.31 | 8.13 |
| Tenacity, gms/dn | 7.53 | 8.41 | 8.46 | 6.73 |
| Elongation to break, % | 24 | 26 | 24 | 28 |
| Knot tenacity, gms/dn | 5.72 | 7.15 | 4.40 | 5.92 |
| Knot efficiency, % | 76 | 85 | 52 | 88 |

EXAMPLE 8

A monofilament was prepared from pellets of nylon 6/66 (85/15 in weight ratio) copolymer, available commercially from BASF corporation as Ultramid C-35. Dried pellets of nylon 6/66 copolymer were extruded at a melt temperature of 222 degrees Celsius through a round spinnerette orifice having a diameter of 0.123 inches. The filament so formed was passed vertically downward through an air gap for 7 inches, quenched in a water bath at 12 degrees Celsius for a distance of 5.5 feet and passed to a feed roll having a surface speed of 125 feet per minute. The filament was then passed through a Miniwipe device, commercially available from Huestis Machine Corporation of Bristol, Rhode Island, to remove surface water, leaving the filament in a substantially moisture-free condition. The filament was then passed through a high temperature furnace having a heated zone length of 4-inches at a temperature of 1500 degrees Celsius, in order to deorient the surface of the filament. After the furnace treatment, the filament was passed to unheated first stage draw rolls having a surface speed of 438 feet per minute.

Between the feed roll and first stage draw rolls, the filament was stretched 3.5X. From the first stage rolls the filament was passed through a 48-inch radiant heater at 450 degrees Celsius and then to second stage draw rolls running at a speed of 688 feet per minute which stretched the high temperature treated and drawn filament an additional 1.57X. From the second stage draw rolls, the filament was passed through a 59-inch radiant heater at 670 degrees Celsius and then to third stage draw rolls running at a speed of 775 feet per minute which stretched the high temperature treated and drawn filament an additional 1.13X for a total draw ratio of 6.2X. From the third draw stage, the filament was passed through a 36-inch heat setting chamber at 350 degrees Celsius and then to letdown rolls running at a surface speed of 736 feet per minute for a relaxation of 5%. The filament was then wound onto a package. The filament formed was clear and transparent, had a diameter of 17.9 mils and had a substantially round cross-section. It had excellent tensile properties and knot strength. The operating parameters and filament properties are summarized in Table III.

EXAMPLE 9

Dried pellets of 6/66 nylon copolymer were extruded into a monofilament according to the general procedure of Example 8 except that an obround die was used with the approximate dimensions of 160 mils X 60 mils.

The filament so formed was passed vertically downward through an air gap for 7 inches, quenched in a water bath at 9 degrees Celsius for a distance of 5.5 feet and passed to a feed roll having a surface speed of 100 feet per minute. The filament was then passed through the same high temperature furnace having a heated zone length of 4-inches at a temperature of 1235 degrees Celsius. After the furnace treatment, the filament was passed to unheated first stage draw rolls having a surface speed of 350 feet per minute.

Between the feed roll and first stage draw rolls, the filament was stretched 3.5X. From the first stage rolls the filament was passed through a 48-inch radiant heater at 450 degrees Celsius and then to second stage draw rolls running at a speed of 550 feet per minute which stretched the high temperature treated and drawn filament an additional 1.57X. From the second stage draw rolls, the filament was passed through a 59-inch radiant heater at 650 degrees Celsius and then to third stage draw rolls running at a speed of 620 feet per minute which stretched the high temperature treated and drawn filament an additional 1.13X for a total draw ratio of 6.2X. From the third draw stage, the filament was passed through a 36-inch heat setting chamber at 350 degrees Celsius and then to letdown rolls running at a surface speed of 589 feet per minute for a relaxation of 5%. The filament was then wound onto a package. The filament formed was clear and transparent. The final filament was also obround and measured 1226 denier. It also had excellent tensile properties and excellent knot strength. The operating parameters and filament properties are summarized in Table III.

Control Example B

Dried pellets of 6/66 nylon copolymer were extruded into a monofilament similar to the conditions of Example 9 except that the temperature of the high temperature furnace was maintained at 1216 degrees Celsius. While this product also had excellent tensile properties, the knot tensile strength was low. Operating data and filament properties are given in Table III.

While the intense zone temperatures in Example 9 and Control Example B differ by only a small amount, the effect of this difference is large because radiant heat transfer varies by the fourth power of the absolute temperature of the source. In this case the differences of the radiant heat are:

$$(1216+273)^4/(1410+273)^4 = 0.61$$

That is, the monofilament in Comparative Example A received only 61% of the intense heat as Example 2.

Control Example C

Dried pellets of 6/66 nylon copolymer were extruded into a monofilament according to the general conditions of Example 9 except that the temperature of the high temperature furnace was increased to 1539 degrees Celsius. This product had reduced tensile properties, but excellent knot efficiency (knot tensile strength expressed as a percentage of tensile strength), indicating that excessive deorientation of the filament in the high temperature furnace has occurred, rather than deorientation of the just filament surface. Operating data and filament properties are given in Table III.

We claim:

1. In the process for production of monofilaments by extruding a thermoplastic polymer through a die, quenching and orienting the extruded polymer to form a monofilament by stretching in at least two draw stages to a total draw ratio of at least about 4.5 times its original length, the improvement comprising drying the surface of the monofilament after quenching and heating the monofilament by passing it in a substantially moisture-free condition through a heating zone having a temperature at least about 800 Centigrade degrees above the melting point of the polymer from which the monofilament is made, for a time sufficient to deorient the surface of the monofilament, but not sufficient to melt the interior of the monofilament, and wherein the monofilament is heated before the last at least 1.3X increment of draw ratio.

2. A process of claim 1 wherein the monofilament is heated by flame.

3. A process of claim 1 wherein the monofilament is heated by flame before the first drawing stage.

4. A process of claim 1 wherein the monofilament is heated by a draw furnace.

5. A process of claim 1 wherein the monofilament is exposed to the heating zone for a period of less than about 0.5 seconds.

6. A process of claim 1 wherein the surface of the monofilament is heated to a temperature of about from 20° C. below the monofilament melting point to 40° C. above the monofilament melting point.

7. A process of claim 1 wherein the monofilament consists essentially of polyamide.

8. A process of claim 7 wherein the polyamide is a copolymer.

9. A process of claim 8 wherein the polyamide is a copolymer of 6 nylon and 6,6 nylon.

10. A process of claim 7 wherein the polyamide has a Relative Viscosity of at least about 50.

11. A process of claim 7 wherein the polyamide has a Relative Viscosity of at least about 70.

12. A process of claim 7 wherein the polyamide consists essentially of 6,6 nylon.

13. A process of claim 1 wherein the monofilament consists essentially of polyester.

14. A process of claim 13 wherein the polyester consists essentially of polyethylene terephthalate.

15. A process of claim 13 wherein the polyester consists essentially of polybutylene terephthalate.

* * * * *